(12) United States Patent
Tran

(10) Patent No.: US 9,162,695 B2
(45) Date of Patent: Oct. 20, 2015

(54) COLLAPSIBLE THREE-WHEELED ALL-IN-ONE GOLF CART

(71) Applicant: Thinh Quang Tran, Elk Grove, CA (US)

(72) Inventor: Thinh Quang Tran, Elk Grove, CA (US)

(73) Assignee: Thinh Tran, Elk Grove, CA (US)

( * ) Notice: Subject to any disclaimer, the term of this patent is extended or adjusted under 35 U.S.C. 154(b) by 0 days.

(21) Appl. No.: 14/336,094

(22) Filed: Jul. 21, 2014

(65) Prior Publication Data

US 2015/0028568 A1 Jan. 29, 2015

Related U.S. Application Data

(60) Provisional application No. 61/958,327, filed on Jul. 24, 2013.

(51) Int. Cl.
*B62B 1/00* (2006.01)
*B62B 3/02* (2006.01)
*A63B 55/08* (2006.01)
*B62B 3/10* (2006.01)
*B62B 5/04* (2006.01)

(52) U.S. Cl.
CPC . *B62B 3/02* (2013.01); *A63B 55/08* (2013.01); *B62B 3/102* (2013.01); *B62B 5/0447* (2013.01)

(58) Field of Classification Search
CPC ...................................................... B62B 1/00
USPC ................. 280/651, DIG. 6, 652–657, 47.26, 280/47.17, 47.315, 642, 639
See application file for complete search history.

(56) References Cited

U.S. PATENT DOCUMENTS

2013/0234420 A1* 9/2013 Reimers et al. ............... 280/651

* cited by examiner

*Primary Examiner* — John Walters
*Assistant Examiner* — James Triggs
(74) *Attorney, Agent, or Firm* — Heisler & Associates

(57) ABSTRACT

A cart that combines the utilities of a conventional three-wheeled pushcart and golf bag into a single piece of equipment. The cart comprises a collapsible three wheeled configuration and push bar. These collapsible mechanisms enable the cart to be transformed into two positions: folded or extended. The cart is also equipped with 14 individual slots (pipes) for holding a standard set of golf clubs. Two tool belts are also attached to each side of the cart for personal storage. In an extended position, the cart is designed to be used for walking as one would when using a "pushcart and bag combination". In a folded position, the cart can be mounted securely onto the back of a motorized cart for riding, similar to a conventional golf bag. This compact folded position is also intended for the purpose and convenience of storage.

19 Claims, 16 Drawing Sheets

COLLAPSIBLE THREE-WHEELED ALL-IN-ONE GOLF CART

BACKGROUND OF THE INVENTION

A) Field of Invention

The game of golf mainly involves the golf course, the golfer, and the golf related equipment. My invention pertains to the golf equipment, specifically for transporting golf clubs and golf related accessories during the play of a golf round. Today, golf clubs are being carried on the golf course by a variety of golf bags. These golf bags come with either hand and/or shoulder straps. Golfers who choose not to manually carry their golf bags are limited to a few alternatives below:

1) Strap the golf bag to a conventional wheeled push or pull cart.

2) Strap the golf bag to the back of a motorized cart for riding.

3) Hire a caddy to carry the golf bag. This option, unfortunately, is very limited since most public golf courses do not have a personal caddy program.

Riding a motorized cart is a more popular choice for most golfers. For those that enjoy walking the course, using a conventional pushcart is the more practical option. Unfortunately, this choice comes with many disadvantages and inconveniences. Storage is the biggest hassle. Carrying a cart in your trunk at all times is an inconvenience as it leaves little room for additional storage space. With the need for having a golf bag, clubs and carts, it is nearly impossible to fit four sets of cart and bag combinations into the trunk of a standard midsize car. This is problematic if you need to carpool with your playing partners. Although modern carts have been redesigned to fold into smaller configurations, nonetheless, no matter how small, it is an additional piece of equipment that you need to store. Another disadvantage is the lost of time. Assembling and disassembling the equipment before and after the round is very time consuming. A golfer must first set the cart from a folded to extended position; then proceed to taking the steps necessary to make sure the bag is properly and securely engaged into the extended cart. After the round of golf, the golfer needs to reverse this time consuming process again in order to store away the two cumbersome pieces of equipment. These disadvantages often steer the golfer away from walking during their round of golf. For this very reason, I was inspired to invent a golf cart that will allow a golfer to walk or ride with a single piece of equipment. I would like to refer to this invention as an all-in-one cart. In a folded position, it is about the size of a conventional golf bag. It will fit securely behind a motorized cart just like a golf bag would without disassembling or removing any components. In an extended position, the cart will operate just like a golf bag strapped onto a three-wheeled pushcart.

The overall objective of the present invention is to provide a convenient thus practical alternative to the traditional method of using conventional "golf bag and pushcart combination".

The following are 15 specific objectives and advantages of the present invention:

1. (Objective) is to design a cart that has collapsible mechanism that can be transformed into a folded or extended position in very few and simple steps, using minimal efforts.

2. (Objective) is to provide the cart with braking capability, which allows the golfer to set the cart in park as needed when used in walking mode during the round.

3. (Objective) is to provide an alternative to a "bag & cart combination" that is easy and convenient to use with just a few simple, straight forward operational steps.

4. (Objective) is to have the cart, at folded position, fit securely on any standard motorized cart as it would with any average golf bag.

5. (Objective) is to save storage space by having just one piece of equipment that does both jobs.

6. (Objective) is to provide a walking cart that will fit golfers with various heights through the use of an adjustable push bar configuration.

7. (Advantage) is, at an extended position, the large wheelbase created by the three wheels provides excellent stability when rolling around the unpredictable terrain on the golf course.

8. (Advantage) is with the three wheel design, the cart is self-stabled thus making it easy to maneuver and saves energy.

This stability also allows the cart to run on its own with forward momentum or going down the slopes on the golf course 9. (Advantage) is that the three wheels are always parallel, even during transitional, making it easy to fold and extend the cart.

10. (Advantage) is that the multi-lightweight material construction such as aluminum and plastic or like materials results in a sturdy, yet lightweight cart, which can be easily handled by any average golfer.

11. (Advantage) is that the design and positioning of the clubs on the cart will make it easy for the golfer to easily keep track of the clubs while playing the game. Each club holding slot can only hold one club, forcing the golfer to keep the clubs separated. This unique position of the club holding slots makes it effortless to keep the golf clubs organized.

12. (Advantage) is allowing the golfer to have convenient access to the two most used golf clubs in a round of golf, the putter and his/her favorite chipping wedge. The two slots are located in the middle of the cart, isolated from the rest of the other 12 golf clubs.

13. (Advantage) is having the removable side plastic pipes and tool belts which allow the golfer to conveniently clean or wash these components. Different color and material options will also be available for personalization.

14. (Advantage) is that the Operating Handle on the cart can also be used as additional leverage when handling the cart.

15. (Advantage) is economical by saving money not paying for a riding cart rental fee.

In conclusion, with innovative design and easy to operate folding mechanisms, it is an object of my invention to provide a practical alternative for a golfer who wants to enjoy the game by walking without dealing with the hassle from the conventional method of using a "golf bag and pushcart" combination. I am hopeful that this will help eliminate the traditionally perceived hassle of walking. I am also hopeful that the ease and convenience of the present invention will help encourage the golfer to walk more often, which is a healthier way to enjoy the game and also save money from not renting the motorized golf cart.

B) Background and Description of Prior Art

Over the years, the golf bag designs have continued to evolve. They are available in smaller and lighter sizes. Some golfers, however, still prefer the oversized cart bag for its storage capacity. The disadvantage of the golf bag, regardless of its size is its portability. A golfer walks an average of five miles during a round of golf (source: Ask.com). To cover this distance, a golfer will either have to manually carry the golf bag or rely on other assisted means such as a wheeled or motorized cart. Although the golf bags themselves are lighter and smaller, with the clubs added, it becomes heavy and cumbersome to haul around. There are also many other golf bag designs with collapsible wheels such as U.S. Pat. No. 6,554,299 B1 and U.S. Pat. No. 7,114,730 B2. However, these designs only have two wheels. The disadvantage of using a two-wheeled golf bag or cart is apparent. It is not self-stabled. The golfer has to hold on to the handle and keep the bag balanced at all times when it is in motion, just as one would, when handling a traveling luggage. This is the very same reason why a three-wheeled cart, such as U.S. Pat. No. 8,191,920 B2 is more preferred over a two-wheeled pull cart. The design of a three or four wheeled cart has also evolved and improved over the years. For the convenience of handling and storage, modern carts are lighter and more compact in a folded position. Regardless of its size and weight, the main disadvantage of these carts is storage. It is an additional piece of equipment that you have to transport when traveling to a golf course in your vehicle. From personal experience, when carpooling with my playing partners, it is nearly impossible to fit four fully loaded golf bags and four carts in a trunk of a mid-sized car. With an increasingly competitive market, cart makers are continuing to push the envelope for more compact and lighter carts. Nevertheless, the disadvantage of these carts is, ironically, their existence.

Recent inventions with 3 or 4-wheeled golf bag & cart combination have also been introduced. As seen in U.S. Pat. No. 8,408,562 B1 this design can solve similar problems with the "cart and bag combination". However, this current invention will not fit on the back of a motorized cart without the hassle of disassembling major components of the design. Thus, it creates an unwanted, added inconvenience factor.

SUMMARY OF INVENTION

By combining the major benefits of a traditional golf bag and the functionality of a three-wheeled cart into an ALL-IN-ONE CART, the objective of my invention is to provide a practical and smart alternative to the use of a conventional golf bag and cart combination when enjoying this beautiful game of golf. In summary, the cart comprises three wheels 1a & 1b and a push bar assembly all are equipped with collapsible mechanism. The cart is to be folded into two positions, folded for storage & riding and extended for walking.

Through the use of the axles and brackets, the rear wheels are installed onto the side struts. The struts are then installed onto the struts brackets, which are then attached to the lower v-base structure via the tallest lower side-pipe connectors. The remaining front wheel is installed into the y-arm 5 which, in turn, is attached to the lower v-base structure. This lower v-base structure is attached to the metal pipe spine. The push bar assembly is attached to the body of the cart through the use of the push bar base brackets and lower linkage elbow brackets. The upper v-base structure completes the physical construction of the cart. Similar to the lower v-base structure, it is connected to the body of the cart via the metal pipe spine. The cart is also equipped with detachable side plastic pipes. They are removable for the purpose of cleaning and replacement in case of damage. A hand brake is also installed on the cart as needed when used in walking mode. In addition, the cart has two tool belts designed to efficiently hold a majority of a golfer's must have's such as golf balls, tees, gloves, divot fixer, range finder, bottled water, wallet, cell phone, and keys. Removal of the tool belts will not directly affect the structural integrity of the cart's design.

BRIEF DESCRIPTION OF THE DRAWING FIGURES

The present invention will now be shown and illustrated through the following drawings in which.

DETAILED DESCRIPTIONS OF THE PREFERRED EMBODIMENTS

Figure 1:
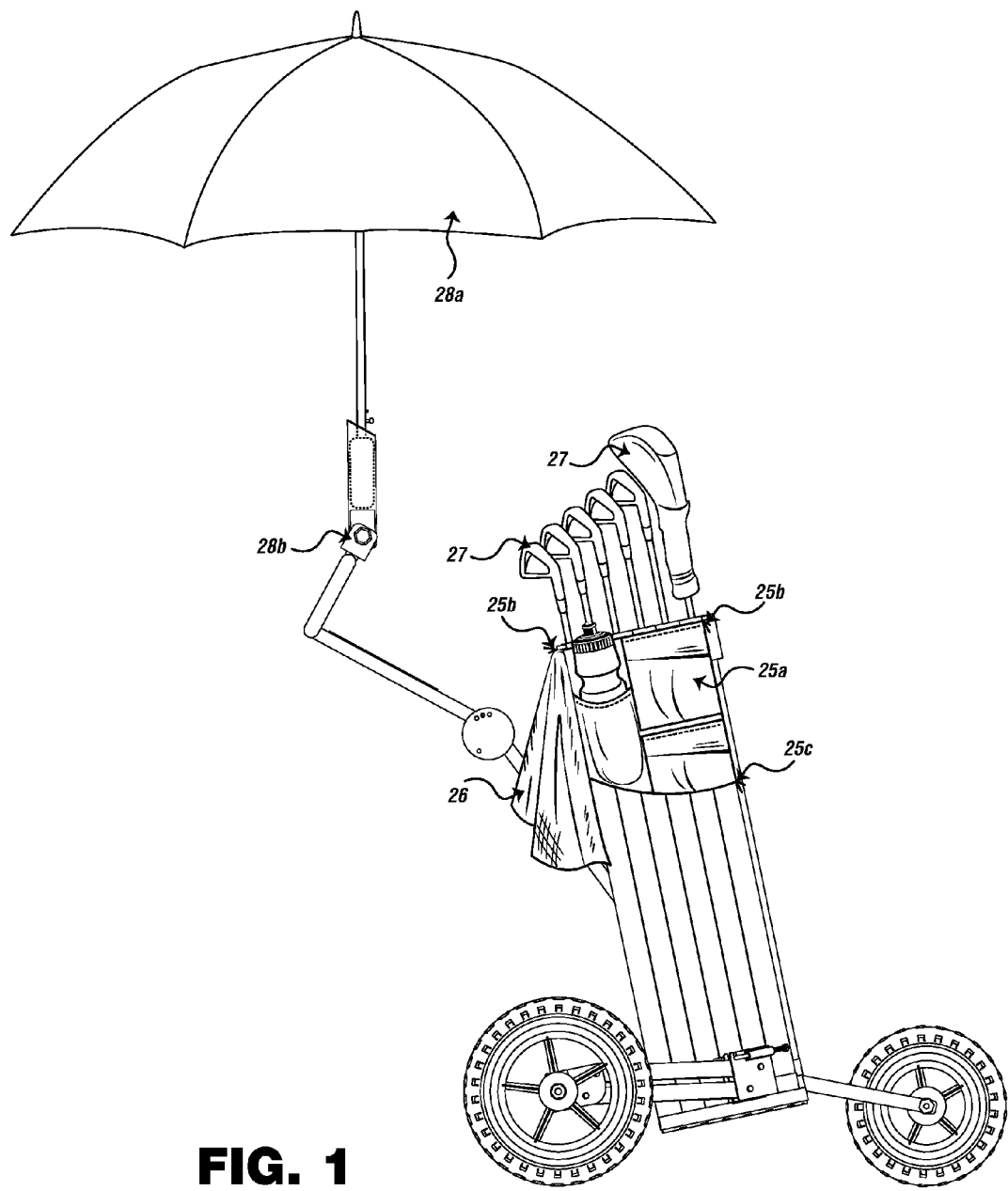
FIG. 1 shows a side view of the cart, at an extended position, fully assembled with accessories and a few golf clubs added.
Figure 2:
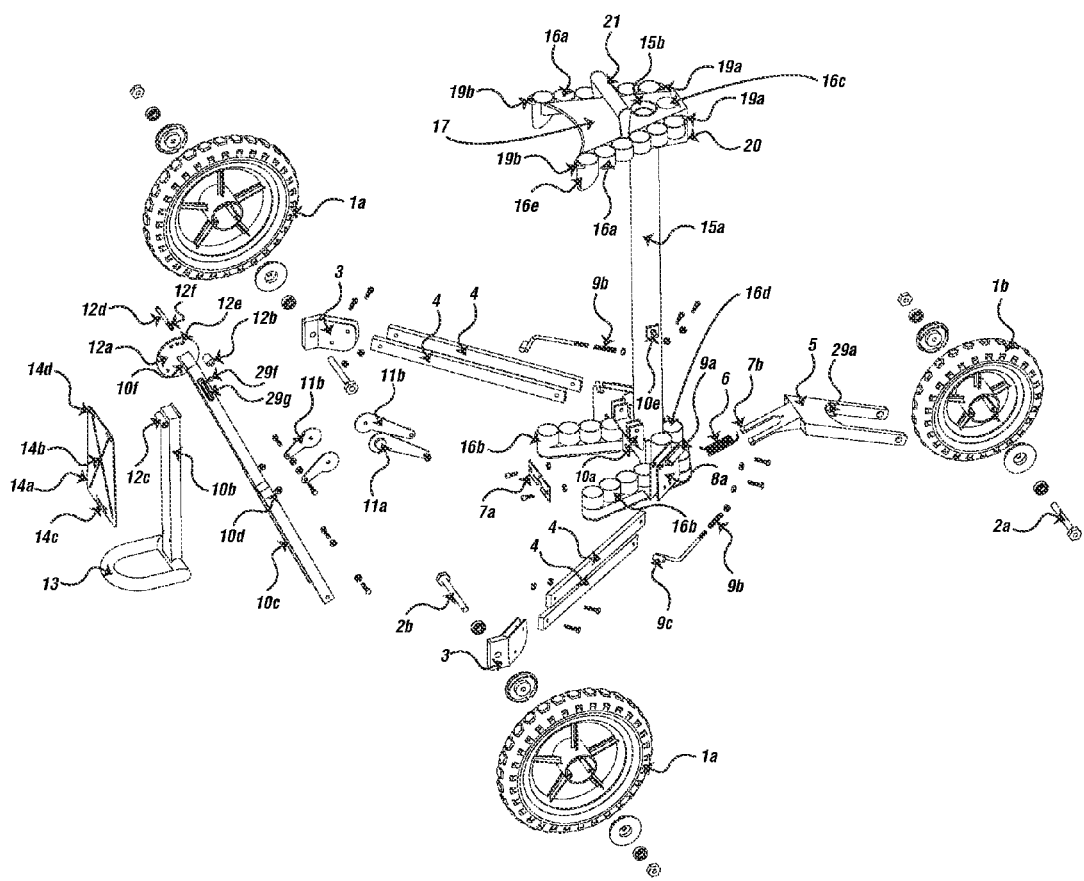
FIG. 2 shows an exploded perspective view of the cart and its components. (To expose important structural components, golf clubs and accessories are not shown.)
Figure 3:
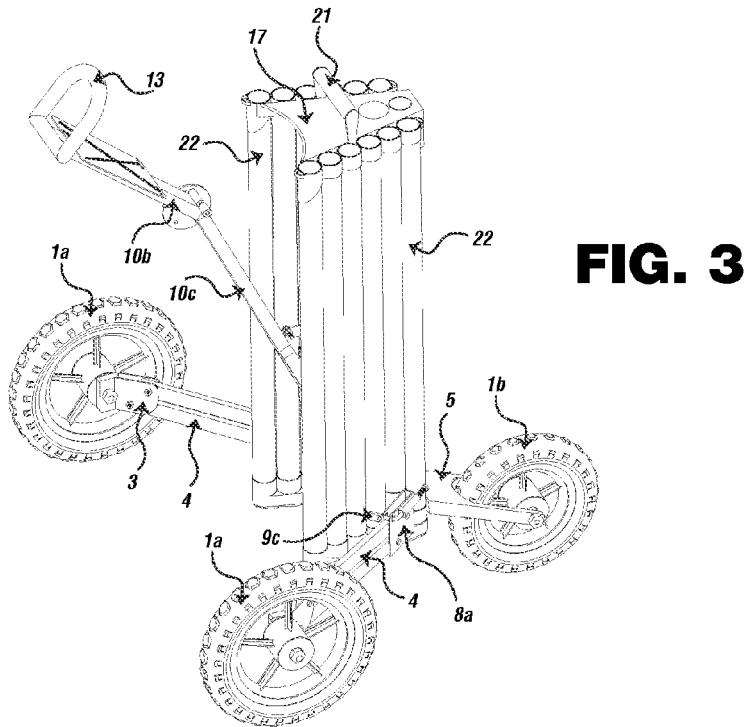
FIG. 3 shows a perspective view of the cart fully extended for walking mode with the side plastic pipes installed (golf clubs and accessories are not shown).
Figure 6:
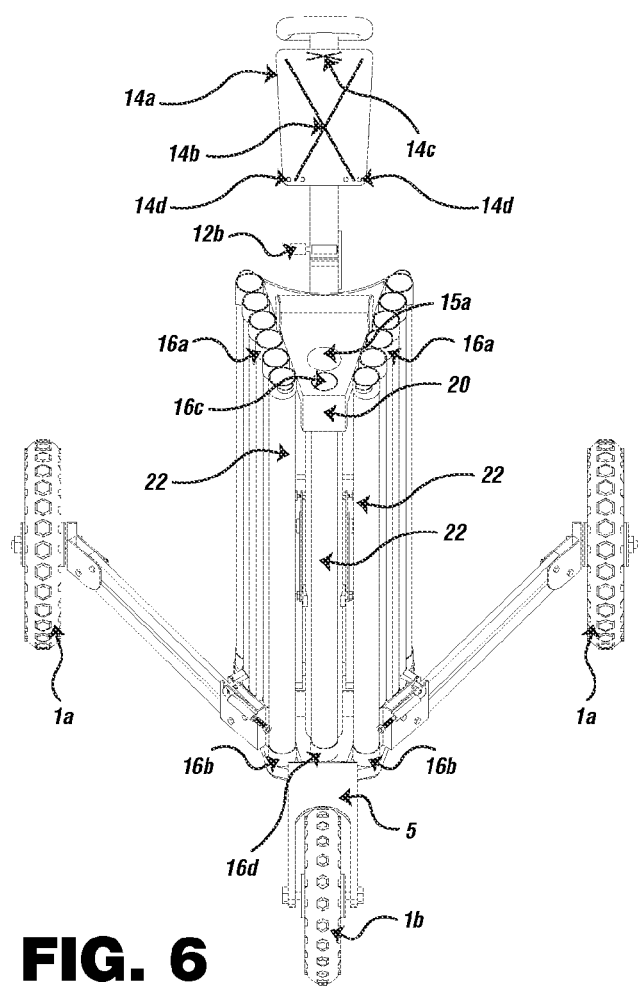
FIG. 6 shows a front perspective view of the cart of FIG. 3.
Figure 7:
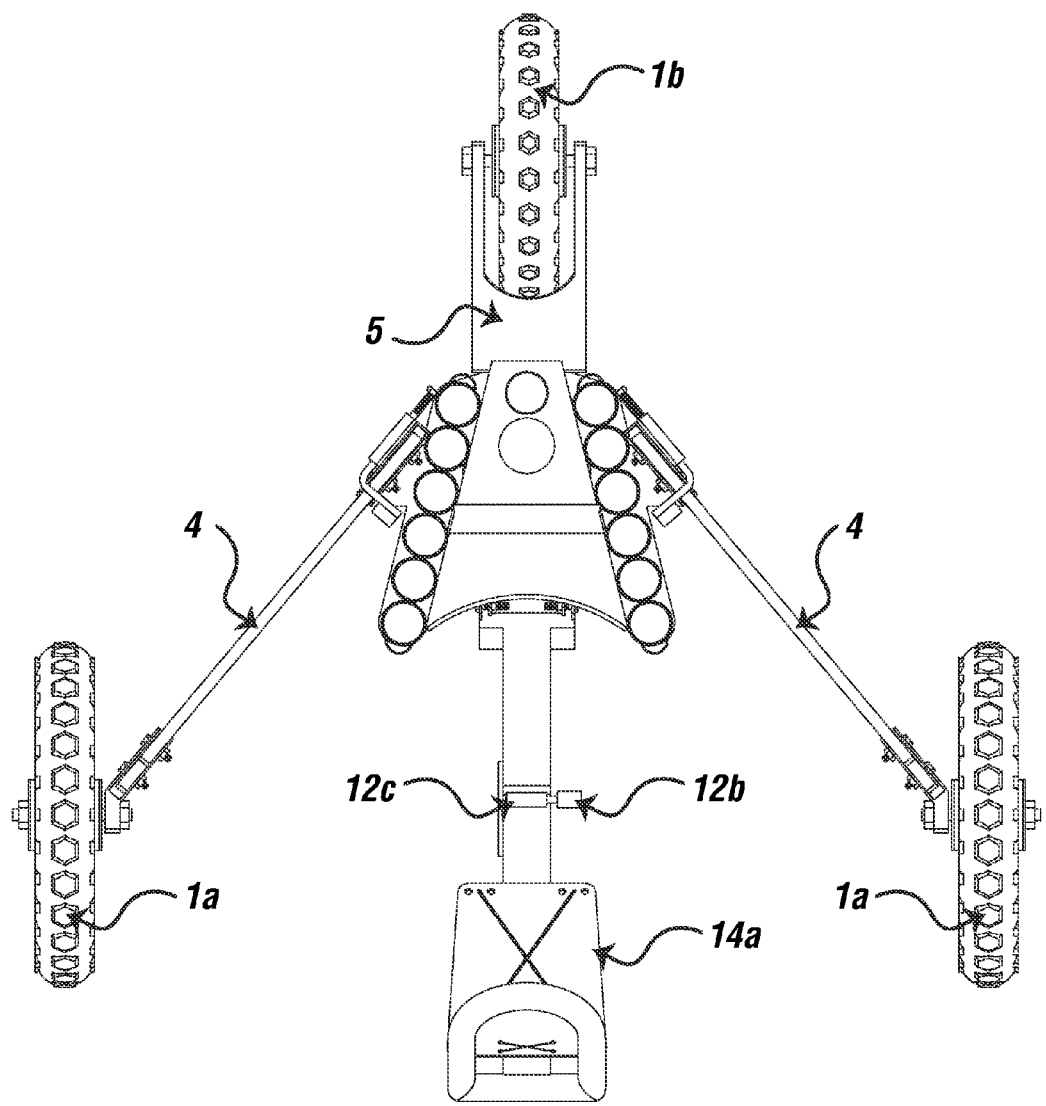
FIG. 7 shows a top view of the cart of FIG. 3.

A cart shown in FIG. 1 comprises eleven major structural components that make up the body of the cart. The following sections will further describe these components and their intended functions within the design of the present invention:

1) THE THREE WHEELS 1a and 1b as shown in FIG. 2 and FIG. 3 come with foam-filled, lightweight, and maintenance-free tires. Wheels 1a are attached to the cart through the use of the wheels' rear axles 2b which in turn are connected to rear wheel brackets 3 as shown in FIG. 2 and FIG. 3. The brackets 3 are then connected to the two side struts 4 in FIG. 3. The side struts 4 are connected to the side strut brackets 8a in FIG. 12. The side strut brackets 8a are attached to the tallest of the lower side-pipe connectors 16b in FIG. 12. The side-pipe connectors 16b are then attached to the two sides of the lower V-Base structure 18 shown in FIG. 10. The front wheel 1b is attached to the cart through the use of the front wheel axle 2a in FIG. 2. The axle is then attached to the Y-arm 5 in FIG. 2. The Y-arm 5 is attached to body of the cart with the use of center hinge 7a in FIG. 5 & FIG. 20 and swivel joint 7b in FIG. 5 & FIG. 19. The center hinge 7a is connected to the body of the cart at the center of the lower v-base structure 18 shown in FIG. 5 & FIG. 20. The three wheels 1a and 1b are designed to remained parallel to each other at all times, even during transition. Thus, they rotate on the same axis, allowing the cart to travel in a straight line while it is in use as walking mode shown in FIG. 6. The broad triangular distances between the three wheels in a fully extended, walking mode position as shown in FIG. 7 provides a sturdy and stable support base. This enables the cart to be self-stabled during movement. In addition, it saves the golfer energy by not having to support or balance the cart at all times. This self-stability also allows the cart to run on its own with forward momentum or rolling down the slopes on the golf course.

2) THE STRUTS 4 as shown in FIG. 2 & FIG. 3 support most of the cart's weight at an extended position. These four side struts work in conjunction with the side brackets 8a shown in FIG. 3 and FIG. 15 to make up the two collapsible positions of the cart: folded (for storage and riding) and extended for walking.

Figure 10:
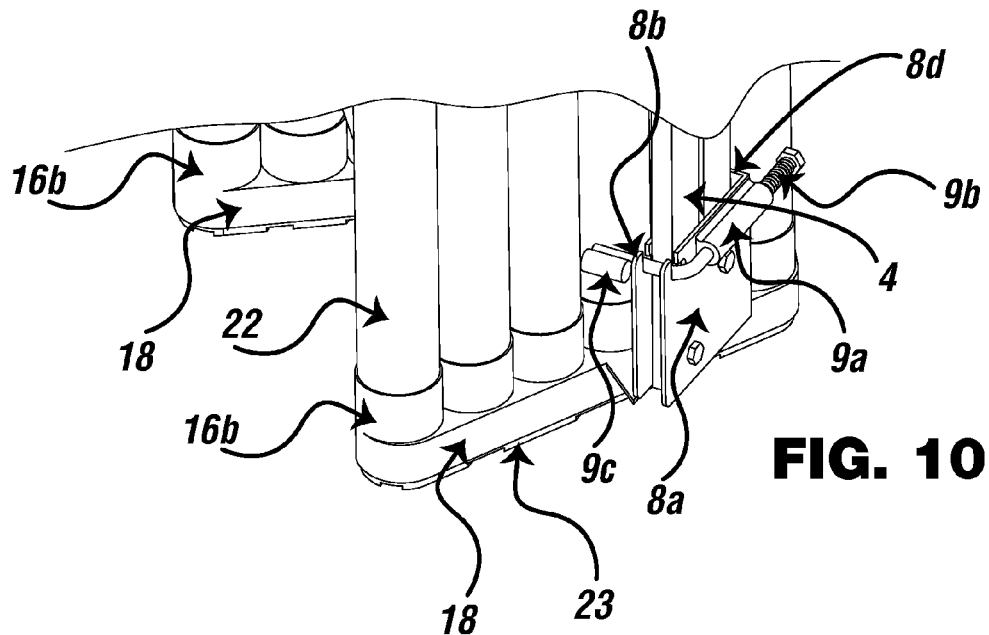
FIG. 10 shows a partial, enlarged perspective view of the cart with the struts in a folded position.
Figure 11:
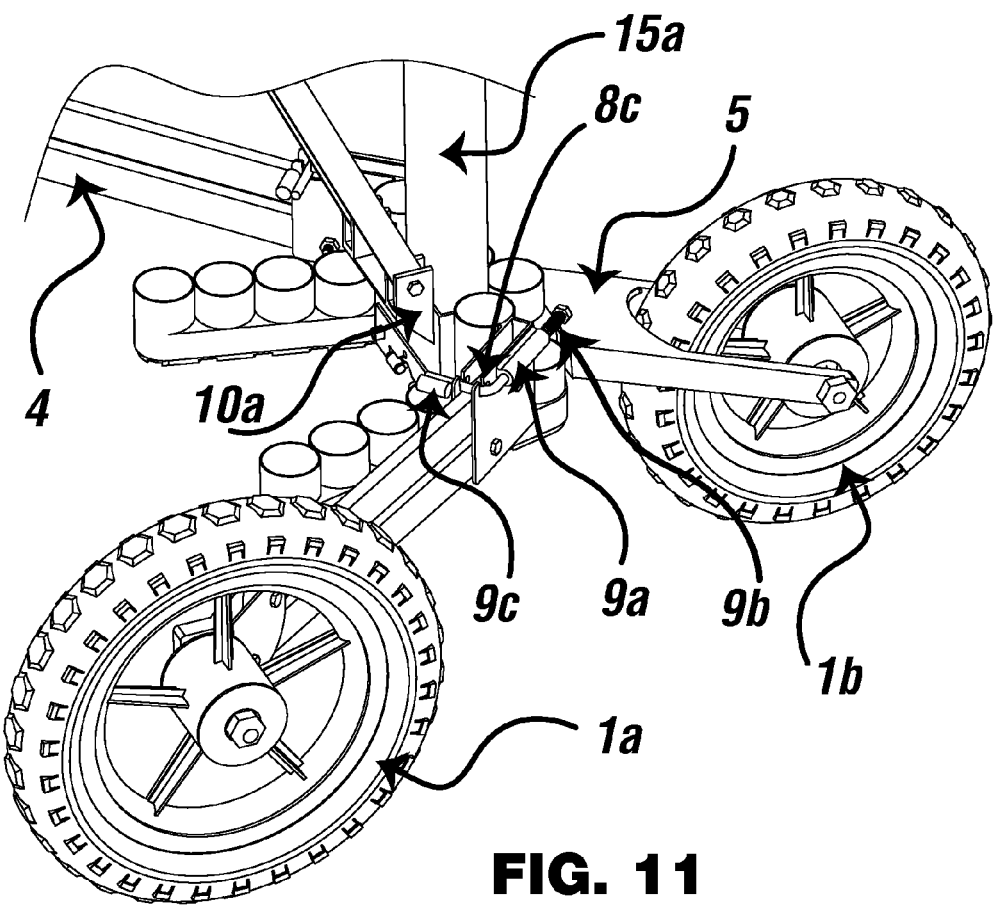
FIG. 11 shows a partial, enlarged perspective view of the cart with the struts in a fully extended position.
Figure 12:
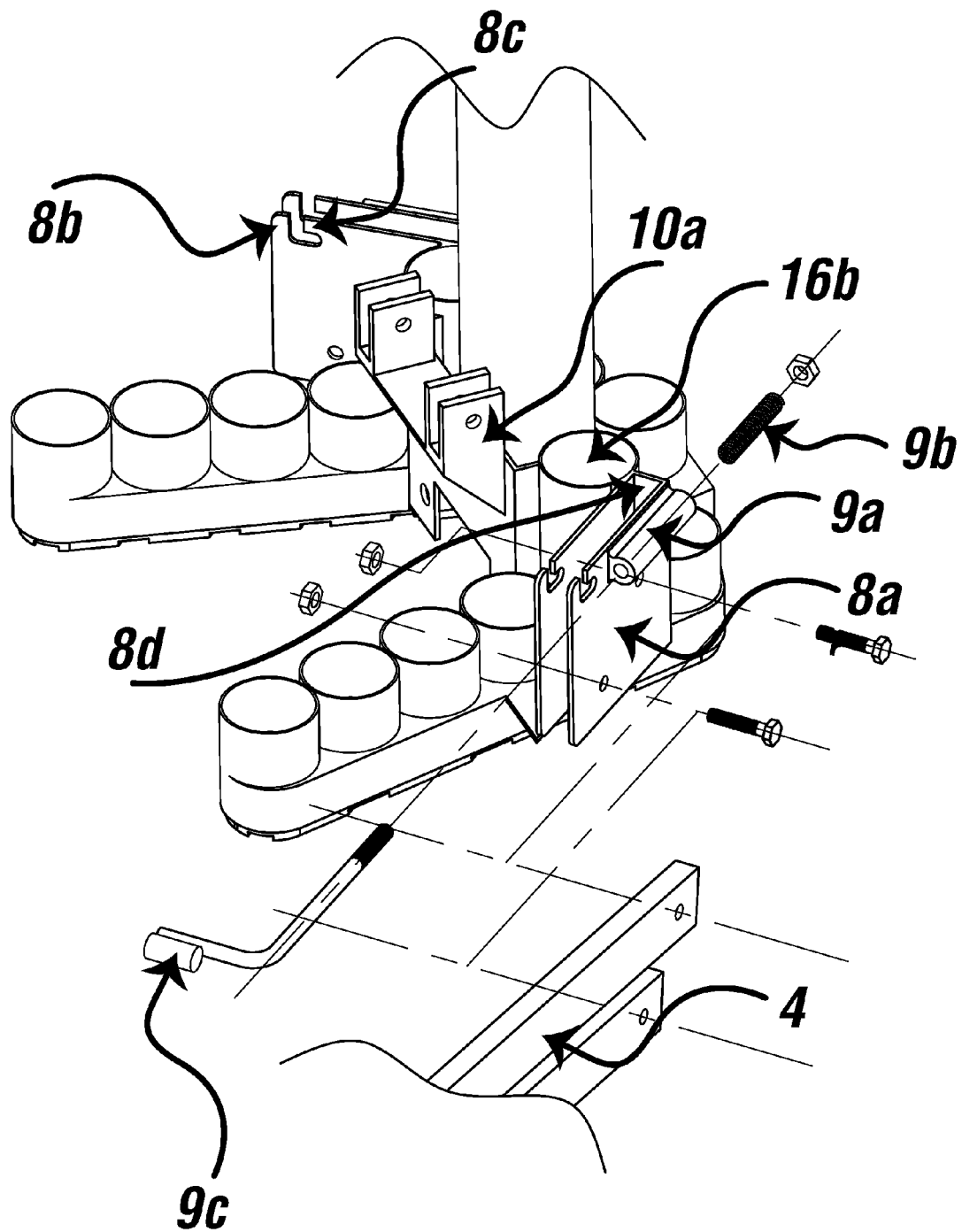
FIG. 12 shows an exploded, partial perspective view of the cart illustrating the components of the right side strut bracket.

3) SIDE STRUT BRACKETS ASSEMBLY 8a-8d and 9a-9c shown in FIG. 10, FIG. 11, and FIG. 12. The two brackets are equipped with lock hatches 8b & 8c shown in FIG. 10, FIG. 11, and FIG. 12. An additional component of the strut bracket 8a is the lock pin assembly 9a-9c also shown in FIG. 10, FIG. 11, and FIG. 12. This lock pin and hatch assembly work together to secure the struts in their folded (storage and riding) and extended (walking) position.

Figure 9:
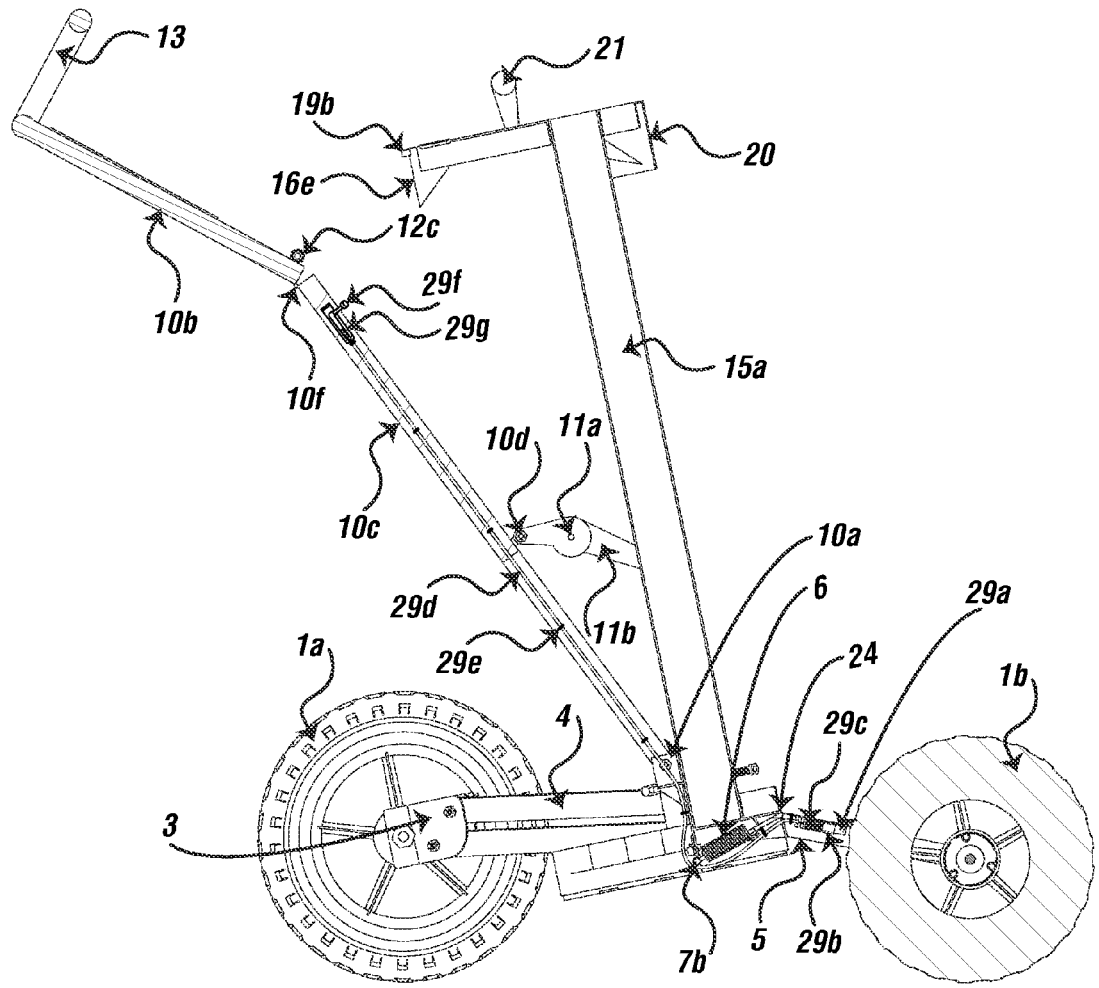
FIG. 9 shows a cross-sectional side view of the cart of FIG. 4. (the handbrake assembly 29a-29g is shown in full representation, not cross-sectional)
Figure 15:
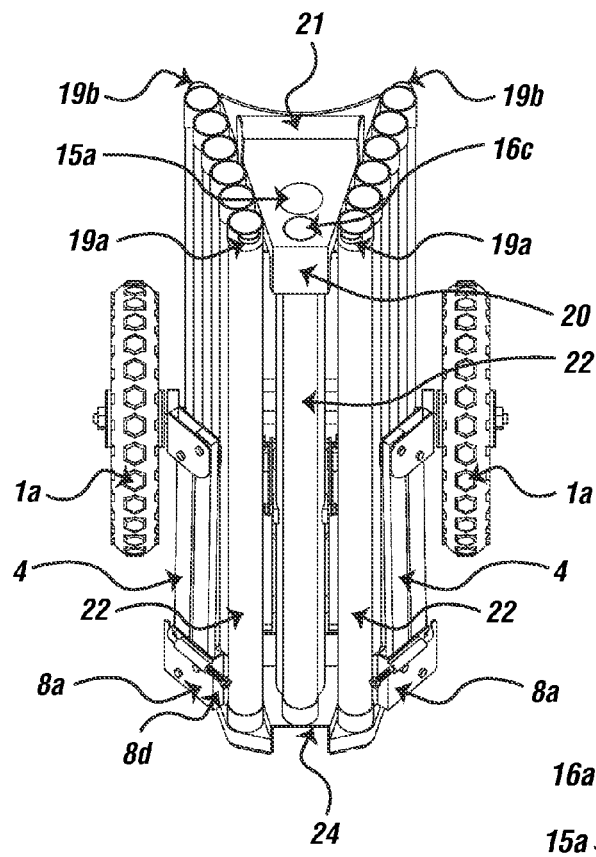
FIG. 15 shows a front perspective view of the cart of FIG. 13 (golf clubs and accessories are not shown).
Figure 19:
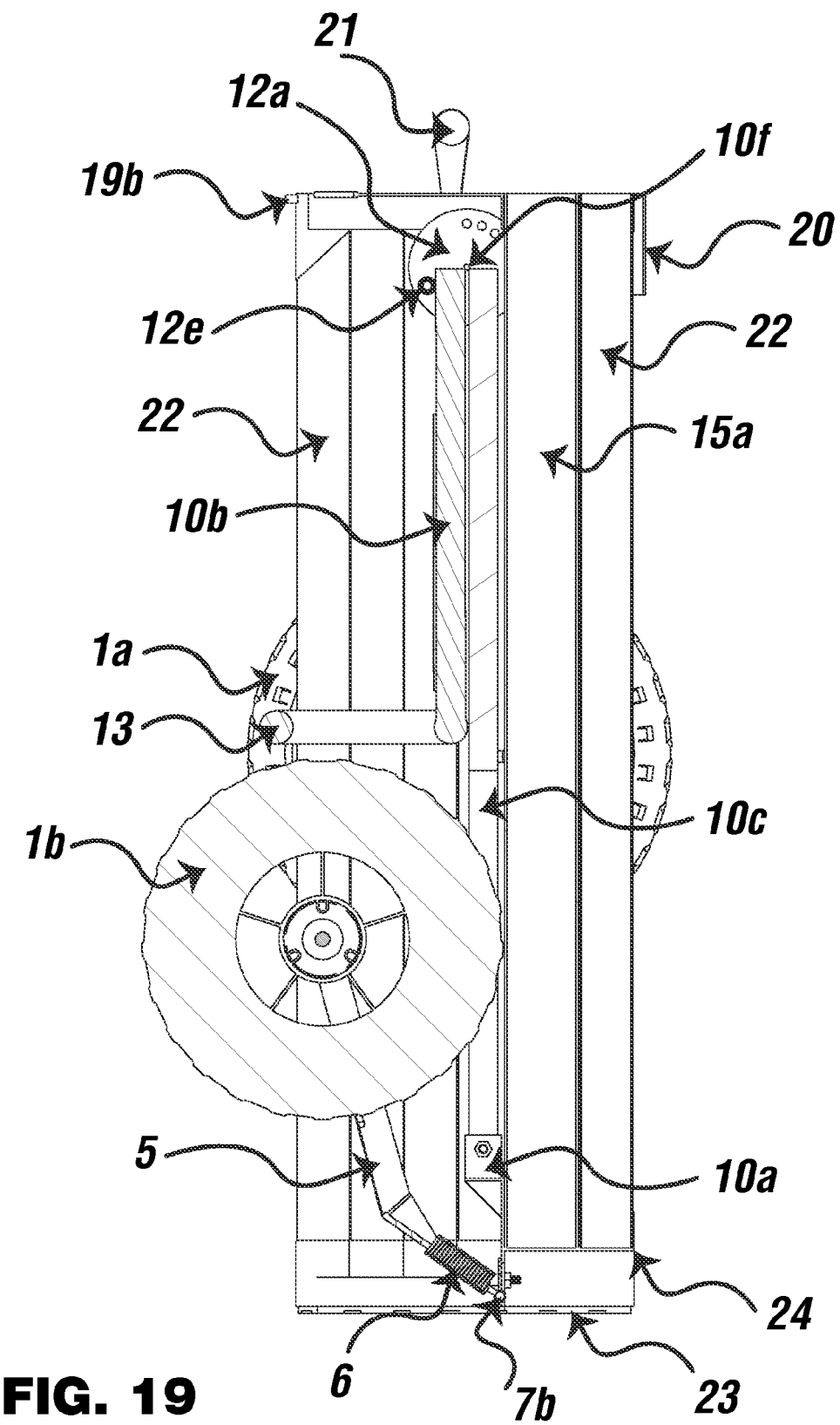
FIG. 19 shows a cross-sectional side view of the cart of FIG. 13.
Figure 20:
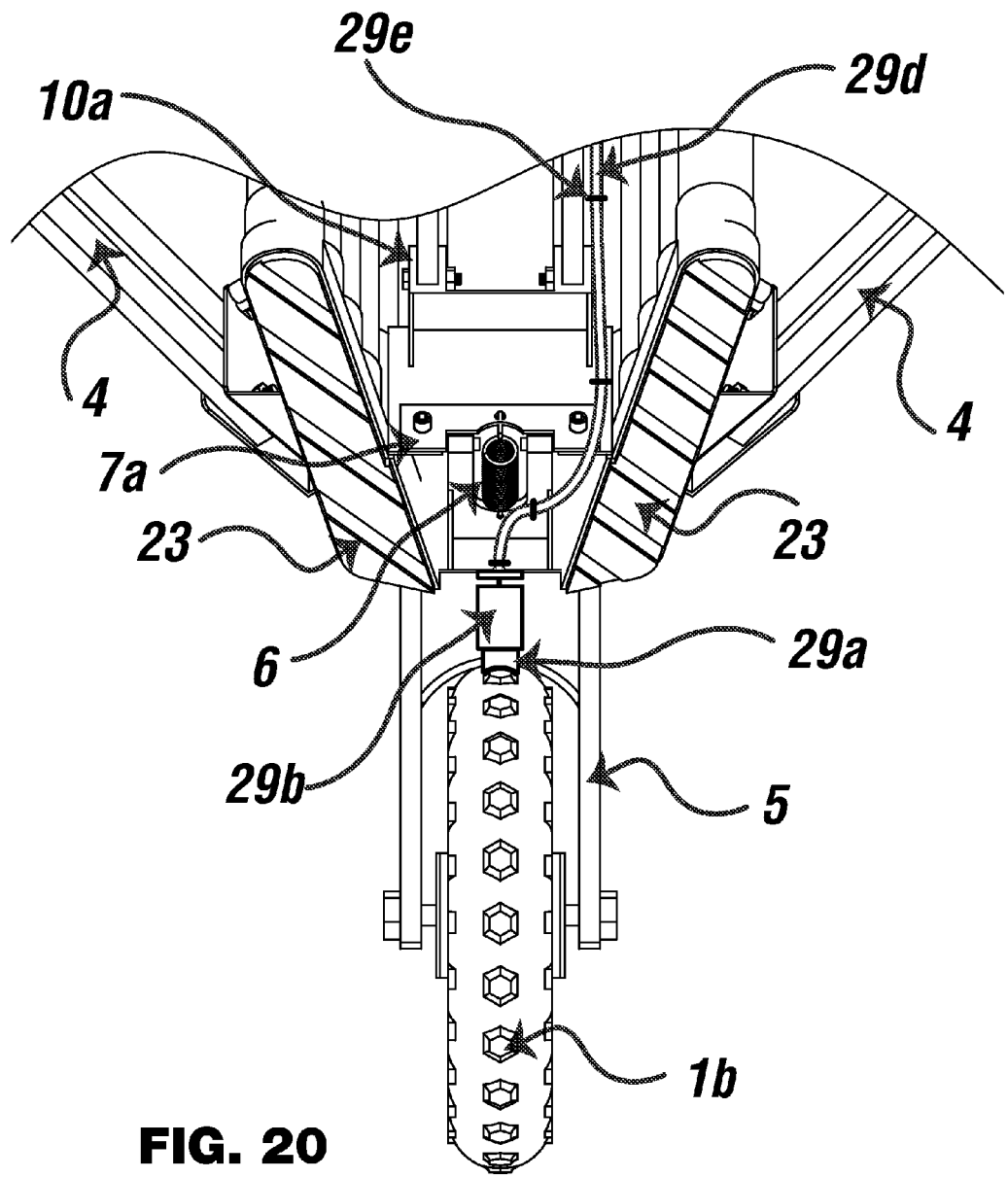
FIG. 20 shows a partial, enlarged perspective bottom view of the cart in a fully extended position.

4) Y-ARM ASSEMBLY 5, 6, and 7a-7b is shown in FIG. 3, FIG. 5, FIG. 19, and FIG. 20. The front wheel 1b is installed to this y-arm, supporting the remaining of the cart's weight at an extended position. A swivel joint 7b connects the y-arm to the center hinge 7a as shown in FIG. 20. The y-arm spring-load 6 shown in FIG. 20 constantly pulls on the y-arm 5 making it want to snap into two possible ends, the front (extended position) or the back (folded position). In the extended position shown in FIG. 3, the upper part of the y-arm will rest firmly on lower v-base crossbar 24 as shown in FIG. 9, FIG. 15, and FIG. 19. This constant pulling motion will help secure the y-arm 5 and the front wheel 1b when the front wheel is lifted for steering purposes in walking mode. In the folded position shown in FIG. 13 and FIG. 19, the spring-load 6 pulls the y-arm in-ward towards the center cavity of the cart, keeping the front wheel 1b pressed firmly against the metal pipe spine 15b shown in FIG. 19. This constant pulling motion will also help secure the y-arm 5 in this position allowing the cart to be folded at its most compact position for riding on a motorized cart and storage.

Figure 4:
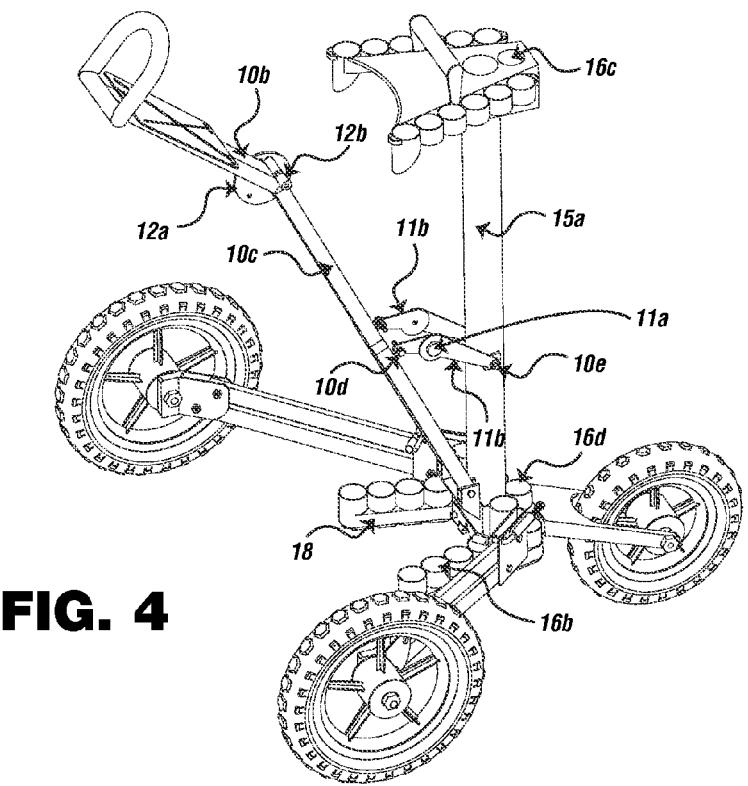
FIG. 4 shows a perspective view of the cart, at an extended position, with the side plastic pipes removed (golf clubs and accessories are not shown).
Figure 13:
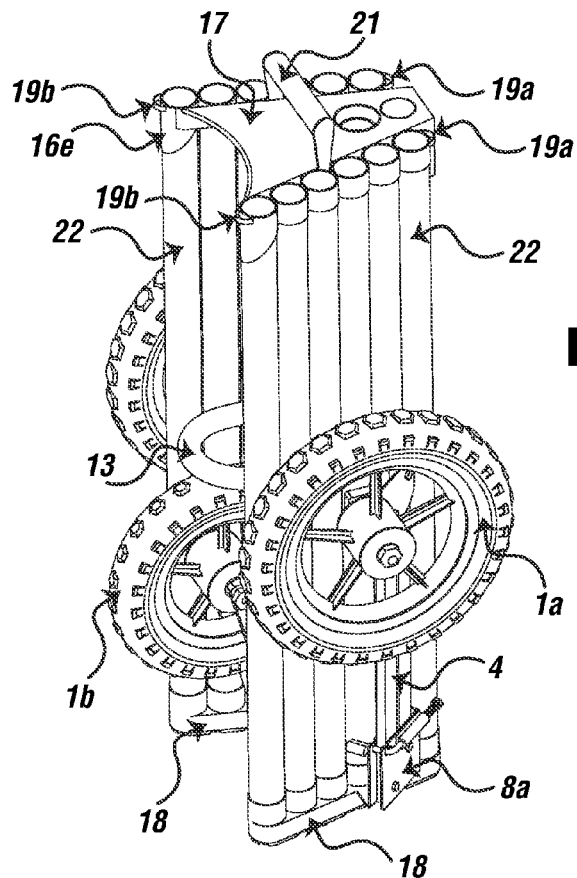
FIG. 13 shows a perspective view of the cart in a folded position for storage and riding mode with the side plastic pipes installed (golf clubs and accessories are not shown).
Figure 18:
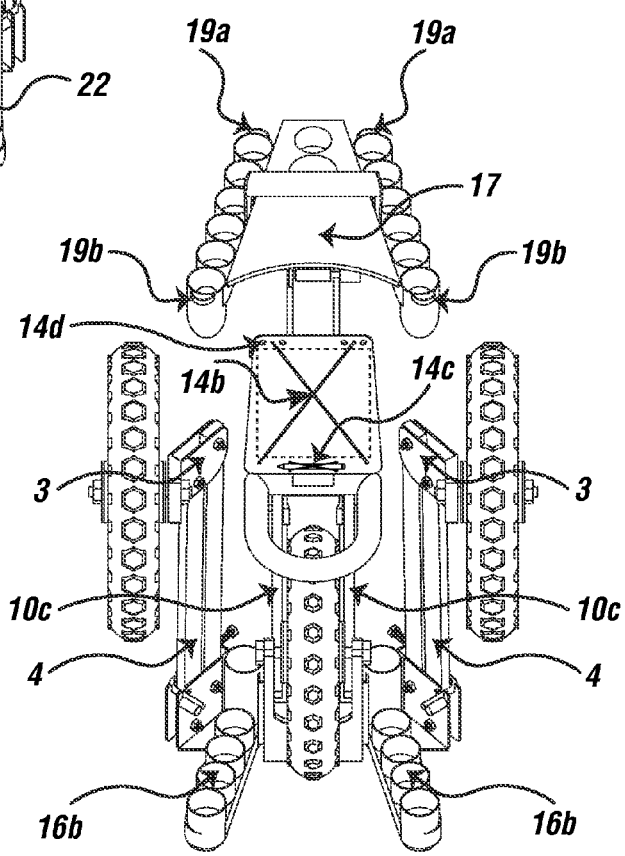
FIG. 18 shows a rear perspective view of the cart of FIG. 14 (golf clubs and accessories are not shown).
Figure 21:
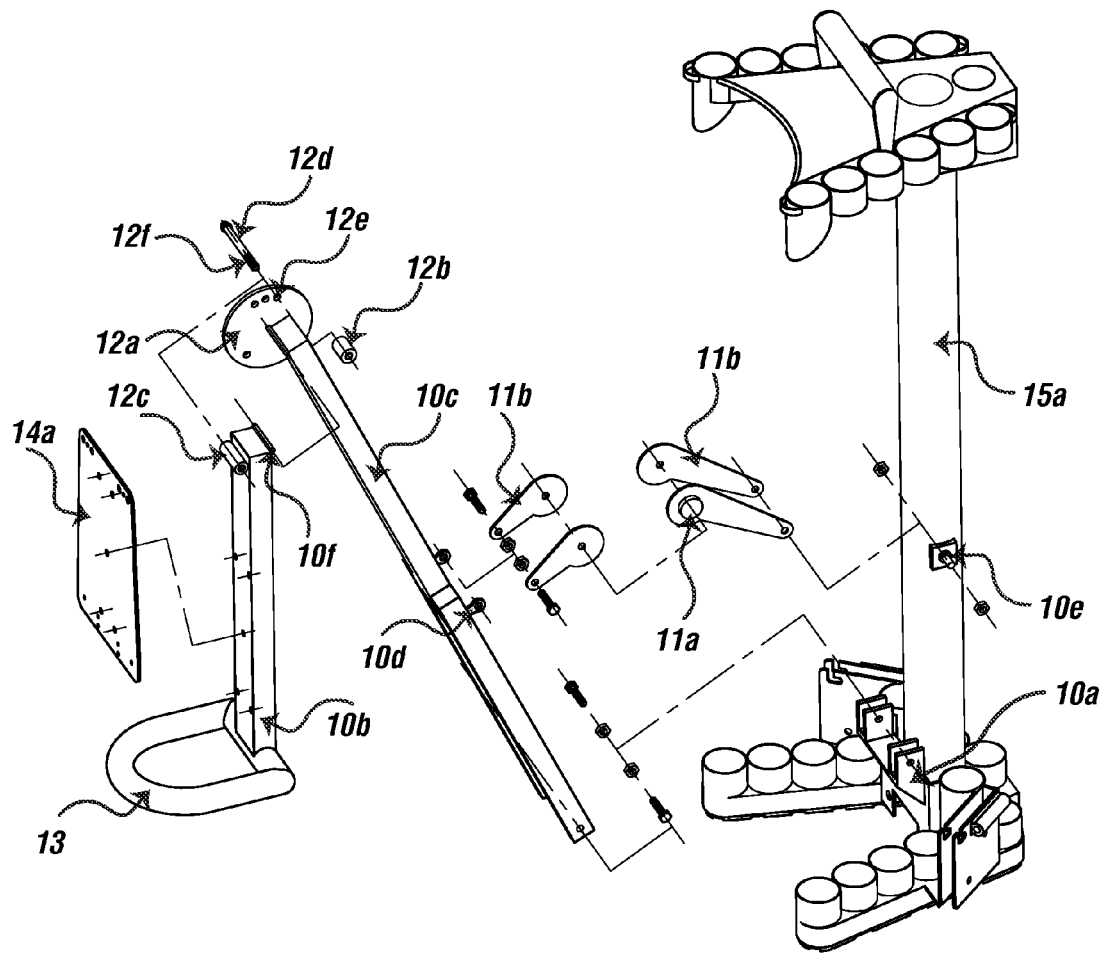
FIG. 21 shows an exploded, perspective view of the cart illustrating the components of the push bar assembly.

5) THE PUSH BAR ASSEMBLY 10a-10f, 11a & 11b, 12a-12f, 13, and 14a-14d shown in FIG. 21. The u-shape ergonomic operating handle 13 in FIG. 21, at an extended walking mode position, is design to be held with the golfer's hands in their most natural position possible, as if one is reaching out for a handshake. As shown in FIG. 1 at the top of the u-shape operating handle 13, a detachable and adjustable umbrella holder 28b could also be added to hold the umbrella 28a to provide shading as needed. In a folded position shown in FIG. 13, this operating handle 13 can be used as extra leverage when lifting the cart or stowing it away in a trunk of a car after use. The operating handle is to be mounted on to the upper push bar 10b shown in FIG. 21. Another component of the push par assembly is the scorecard console 14a-14d shown in FIG. 2 and FIG. 18. This component is equipped with scorecard straps 14b, pencil straps 14c, and golf tee holders 14d as shown in FIG. 2 and FIG. 18. The most important component of the push bar assembly is the adjustable dial plate assembly 12a-12f shown in FIG. 4, FIG. 7, FIG. 19, FIG. 21. The lock pin 12d comes with a knob 12b shown in FIG. 21. The pin 12d and knob 12b along with the spring-load 12f (not shown) is installed inside the pin housing 12c shown in FIG. 2 & FIG. 21. Together with the joint hinge 10f show in FIG. 19 and FIG. 21, the dial plate assembly enables the push bar 10b & 10c shown in FIG. 21 to set in four desired prefixed positions 12e using the lock pin 12d and adjustable prefixed positions 12e shown in FIG. 21. The lowest prefixed adjustable position 12e shown in FIG. 19 is used to set the push bar in its most compact position (folded) as shown in FIG. 13 & FIG. 19. The three remaining prefixed adjustable positions (grouped together) 12e as shown in FIG. 21 is use to set the push bar to three different desired positions to accommodate the golfer's height. The push bars 10b & 10c are joined together by the use of the joint hinge 10f as shown in FIG. 9, FIG. 19, and FIG. 21. The base of lower push bar 10c is connected to the cart through the use of the base bracket 10a as shown in FIG. 9 & FIG. 21. The entire push bar 10b & 10c shown in FIG. 21 is also attached to the body of the cart via the metal pipe spine 15a using the linkage elbow brackets 10d & 10e shown in FIG. 21 and linkage joint 11a & linkage elbows 11b also shown in FIG. 21. Linkage joint 11a has built-in friction for positional placement allowing the push bar assembly to stay put when in folded position. At an extended position shown in FIG. 4, the push bar will maintain this position because the linkage elbows 11b will snap to lock position when they are fully stretched. In this extended position shown in FIG. 3, the golfer can apply downward pressure on the operating handle 13 shown in FIG. 3 to lift the front wheel 1b for steering and maneuvering the cart.

Figure 23:
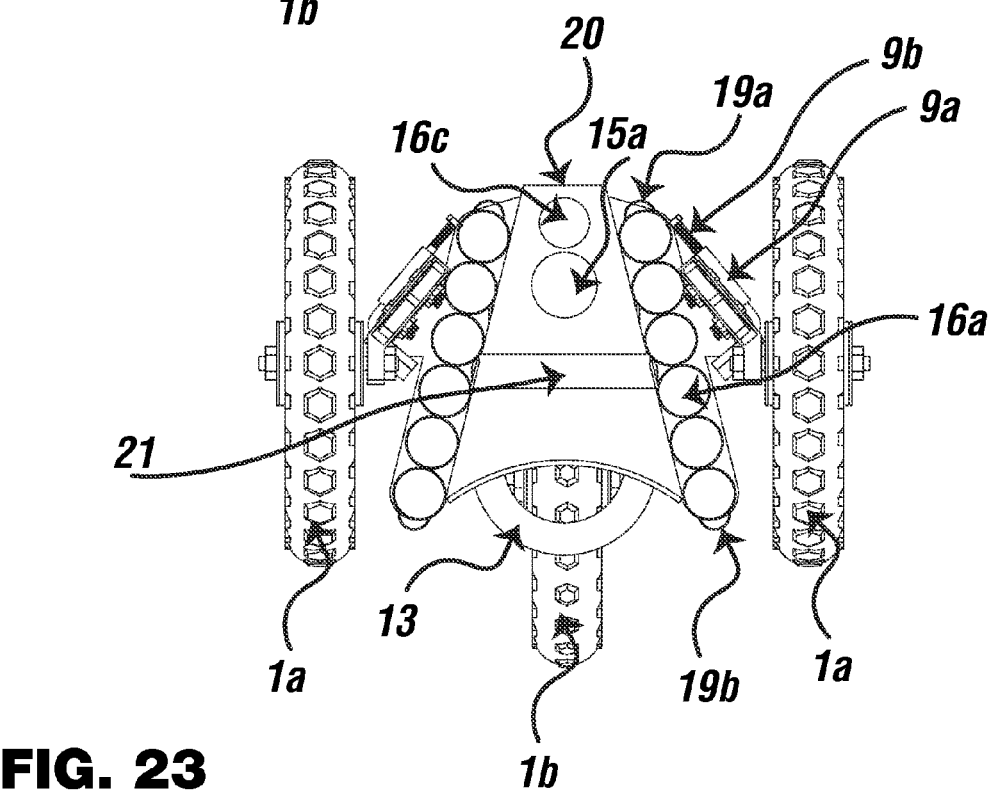
FIG. 23 shows a top view of the cart of FIG. 22 (golf clubs and accessories are not shown).

6) LOWER V-BASE STRUCTURE 18 shown in FIG. 10 and FIG. 13 supports the lower structural integrity of the cart. Most major components mentioned in this section are directly connected to this structure. Specifically, the side strut brackets assembly 8a-8d, 9a-9c shown in FIG. 10 and FIG. 10, the y-arm 5 assembly 5, 6, and 7a-b shown in FIG. 3, FIG. 5, FIG. 19, and FIG. 20, the base brackets 10a in FIG. 11, and the metal pipe spine 15a shown in FIG. 11. The lower v-base structure has a total of thirteen pipe connectors. Two sets of six side-pipe connectors 16b and one center-pipe connector 16d shown in FIG. 6. These connectors are used in conjunction with the twelve upper center-pipe connectors 16a and upper center-pipe connector 16c shown in FIG. 2 to hold the detachable plastic pipes 22 in place shown FIG. 6. The front-center of the lower v-base structure 18 forms a crossbar 24 as shown in FIG. 9, FIG. 15, and FIG. 19. This crossbar functions as a stopper for the y-arm 5 shown in FIG. 9. In the extended position, the back of the y-arm 5 will rest firmly against this crossbar 24 as shown in FIG. 9, FIG. 15, and FIG. 19. At the bottom of the lower v-base structure 18, two rubber liners 23 are installed as shown in FIG. 19 and FIG. 23 to provide a buffered, dampening contact surface with the ground as apposed to exposed metal. In a folded position shown in FIG. 13, the lower v-shape structure 18 base forms a stable self-standing v-base that is broad enough to accommodate the weight of the fully loaded cart. Yet, it is compact enough fit on most motorized cart's platform.

Figure 5:
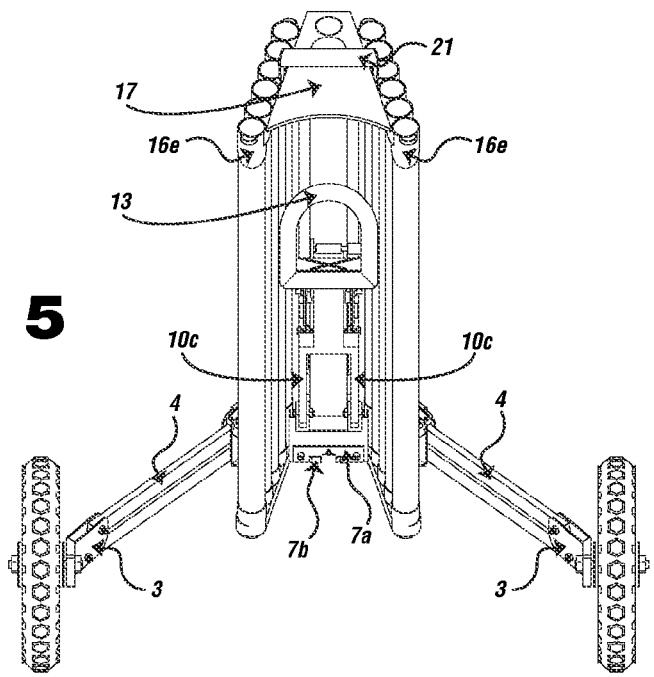
FIG. 5 shows a rear perspective view of the cart of FIG. 3.

7) UPPER V-BASE STRUCTURE 17 as shown in FIG. 2 and FIG. 5 has a total of thirteen pipe connectors 16a and 16c, mirroring the positions of the lower pipe connectors 16b and 16d mentioned in the lower v-base structure 18 shown in FIG.

Figure 17:
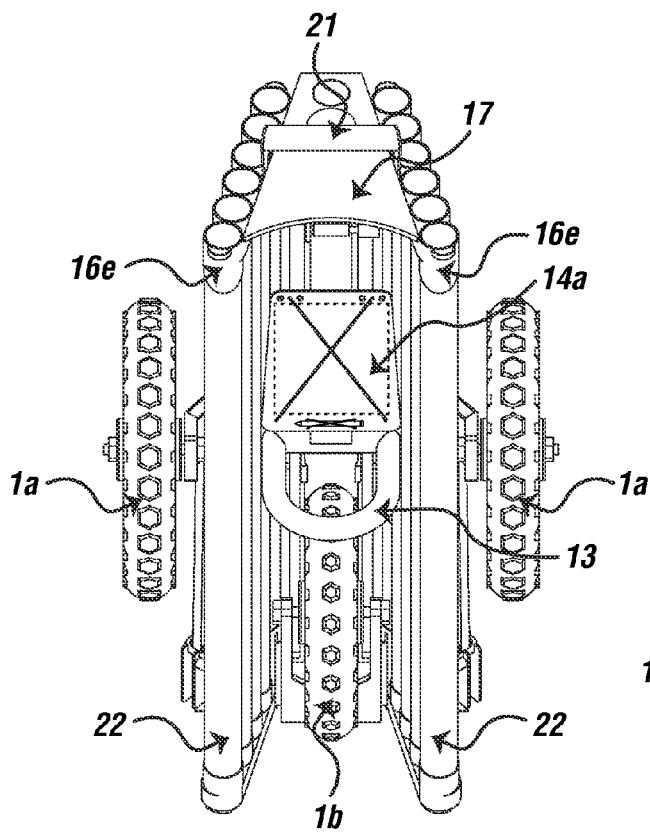
FIG. 17 shows a rear perspective view of the cart of FIG. 13 (golf clubs and accessories are not shown).

4. The pipe connectors comprises two sets of six side-pipe connectors 16a and one center-pipe connector 16c shown in FIG. 6. These connectors are used in conjunction with the twelve lower side-pipe connectors 16b and lower center-pipe connector 16d shown in FIG. 2. These 13 connectors 16a-16d shown in FIG. 2 work in conjunction to hold the detachable plastic pipes 22 in place shown FIG. 6. Two of the upper side-pipe connectors 16a located on the rear of the v-base structure, come with an elongated body 16e as shown in FIG. 5 and FIG. 17. This added surface is designed for the motorized cart's strap to fasten against to keep the cart secured during the ride.

Figure 8:
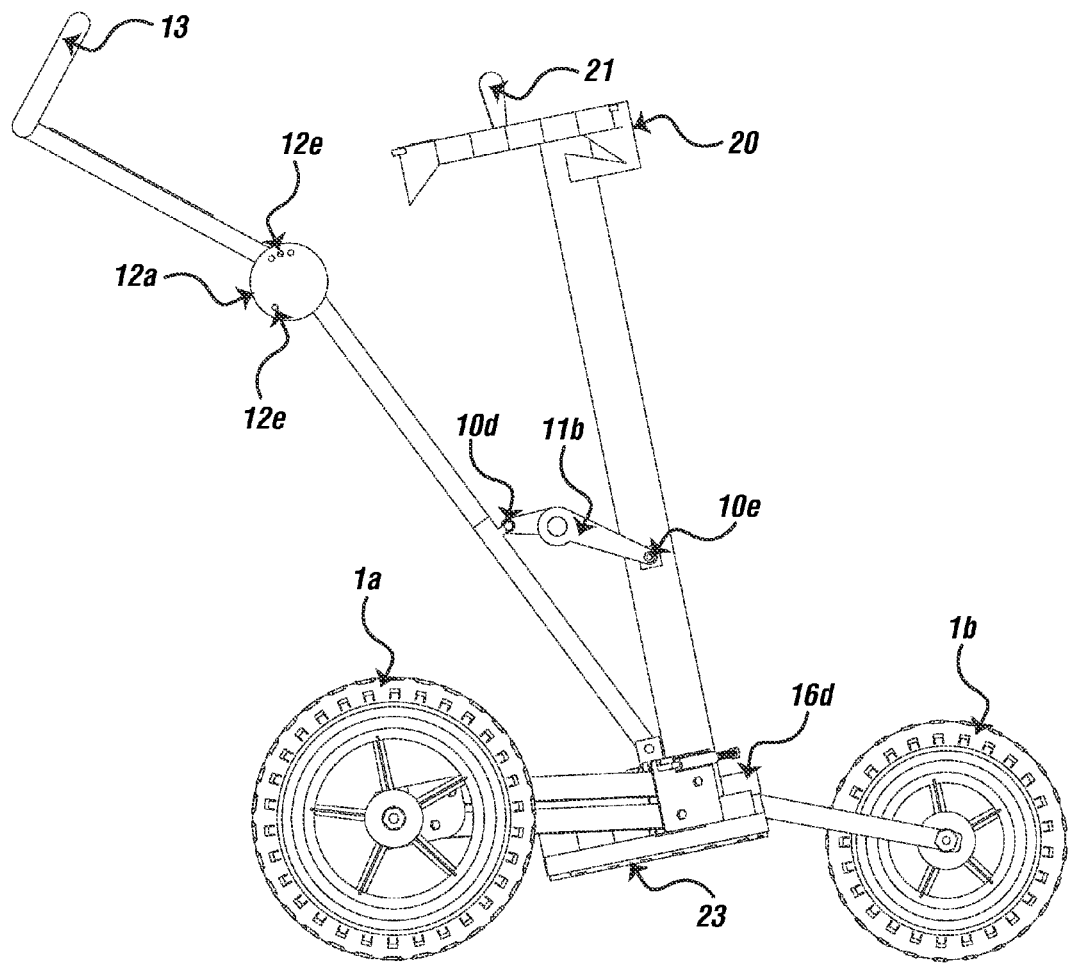
FIG. 8 shows a side view of the cart of FIG. 4.

An impact absorber 20 shown in FIG. 8 and FIG. 15 is also attached to the front of the upper v-base structure 17. This impact absorber 20 will be the only upper contact point between the cart and motorized cart. When the cart is strapped on to the motorized cart, it will press against the back of the motorized cart, absorbing all the rattles and bumps from the motorized cart during the round of golf. The two front and rear sets of upper side-pipe connectors 16a are equipped with tool belt brackets 19a & 19b shown in FIG. 13 & FIG. 15. The tool belts 25 shown (only one side) in FIG. 1 come with two sets of strings 25b and 25c also shown in FIG. 1. The strings upper strings 25b will be tied into the brackets 19a & 19b holding the tool belt 25 securely in place on the cart as shown in FIG. 1. The lower strings 25c can be used to tie to the front and rear side pipes 22 shown in FIG. 1

The upper v-base structure also has two openings: One is the metal pipe spine 15a shown in FIG. 15. The other is the upper center-pipe connector 16c. Both of these openings are strategically placed to hold the two most frequently used golf clubs in an average round of golf, the putter and chipping wedge. Unless the golfer hits a hole-in-one, he/she will need to reach for the putter on every hole. The wedge, also referred to as a lob, sand, or gap wedge is typically used for the shorter approach shots. Most golfers, when missing their long approach shot on to the putting green, they have a favorite go-to wedge used for these recovery shots. Like the putter, that go-to wedge gets used a lot and often together. Therefore, the placement of these two clubs on the cart (isolating them from the other clubs) makes it easy for the golfer to identify and grab them as needed. The putter, by nature, typically has a larger grip size will be held in the said pipe spine. The go-to wedge will be held in the other said center side pipe.

Additionally, a lift bar 21 is mounted to the upper v-base structure 17 as shown in FIG. 2. This lift bar 21, in conjunction with the operating handle 13, as shown in FIG. 13 is used for lifting and handling the cart in all positions, mainly to lift the cart for storage when it is in a folded position.

Figure 14:
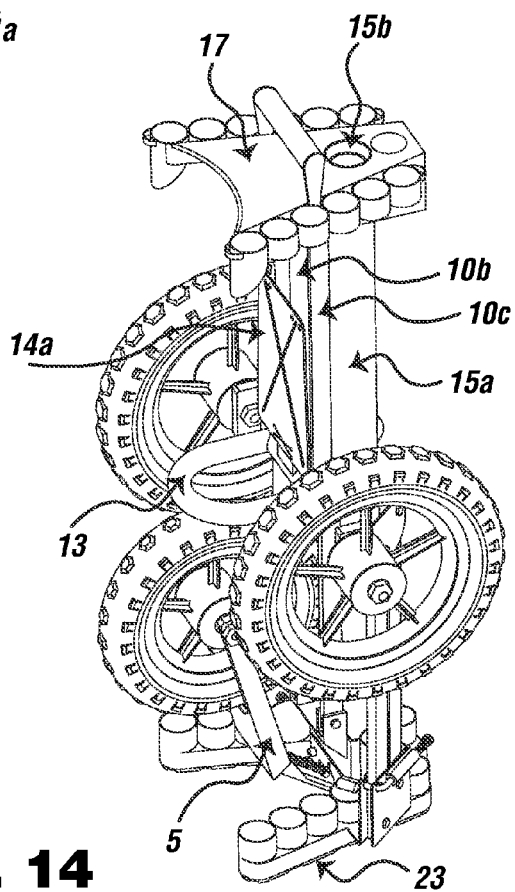
FIG. 14 shows a perspective view of the cart in a folded position for storage and riding mode with the side plastic pipes removed (golf clubs and accessories are not shown).
Figure 16:
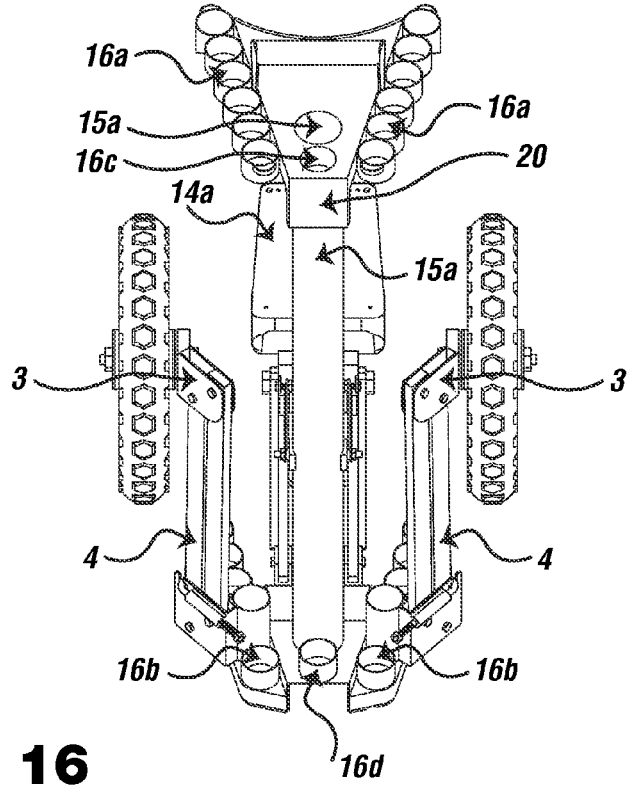
FIG. 16 shows a front perspective view of the cart of FIG. 14 (golf clubs and accessories are not shown).

8) THE METAL PIPE SPINE 15a shown in FIG. 2, FIG. 9, and FIG. 16 comes with a rubber ring liner 15b shown in FIG. 2, FIG. 13, and FIG. 14 to soften the impact and rattling noise created by the steel putter shaft against the inner cylinder wall of the metal pipe. Beside providing a place holder for the putter, its main purpose is to connect the upper and lower v-base structures 17 & 18 together as shown in FIG. 2. The metal pipe spine 15a literally functions as a spine of the present invention. With the detachable plastic pipes 22 not permanently glued on, the metal pipe spine 15a is the main support of the entire cart structure. It also works in conjunction with the push bar assembly 10a-10f, 11a & 11b, 12a-12e, and 13 shown in FIG. 8 & FIG. 21 to assist with steering and maneuvering during walking mode.

9) DETACHABLE PLASTIC PIPES 22 as shown in FIG. 1, FIG. 3 and FIG. 13. These lightweight pipes are made from durable plastic or like materials. They are removable for the purpose of cleaning and replacing in case of damage. This is to be expected since the cart will typically be stored in a trunk of a car, causing physical contact with surrounding objects and vehicular structures. These plastic pipes 22 also provide leverage for the tool belt bottom strings 25c to be tied to, securing the tool bets 25a in place as shown in FIG. 1.

These pipes 22 are to be attached to the side-pipe connectors 16a-16d by applying a light coat of rubber cement or like temporary adhesive as needed.

10) HAND BRAKE ASSEMBLY 29a-29g as shown in FIG. 2, FIG. 9, and FIG. 20. During a round of golf, a golfer will often need to park the cart preventing it from rolling away. Thus a hand brake assembly 29a-29g is provided. The hand brake lever 29f is conveniently located within arm's reach as shown in FIG. 9. The brake pin 29a shown in FIG. 9 works in conjunction with the spring-load 29c shown in FIG. 9 will push forward towards the front tire 1a applying enough pressure to create friction between the brake pin 29a and tire 1a to stop the tire from rolling. As shown in FIG. 9, the brake cable 29d engages the brake lever 29f and brake pin 29a allowing the two components to work simultaneously. As shown in FIG. 9 and FIG. 20, the cable brackets 29e are strategically positioned to secure the brake cable 29d against the cart's body. The brake spring-load 29c is nestled inside the brake pin housing 29b as shown in FIG. 9. The brake lever housing 29g shown in FIG. 9 has a built-in lock hatch to help engage and release the brake lever as needed. Also shown in FIG. 9, the spring-load 29c works in conjunction with the brake pin 29a, the brake cable 29d, and brake lever 29f to release and engage the brake pin 29a as needed by the golfer.

11) TOOL BELTS 25a as shown in FIG. 1 (the second tool belt on opposite side is not shown). These tools belts are add-on attachments and play no structural roles in the bodily construction of the cart. There will be one tool belt on each side of the cart. The tool belts 25a are attached to the cart through the use of strings 25b & 25c located at the four corners of each tool belt. The top strings 25b are tied to the front and rear tool belt brackets 19a & 19b as shown in FIG. 1 & FIG. 15. The bottom strings 25c are to tie around the front and rear removable plastic pipes 22 as shown in FIG. 1.

Together, the two tool belts will provide storage space for your wallet, keys, cellular phone, golf balls, gloves, tees, water bottle, and other small to medium golf-related items. With the option to be removed independently without compromising the structural integrity of the cart, the tool belts can be taken off for cleaning. Different color and material options will also be available for personalization.

The following sections will further elaborate on the functionality of the cart and the role of the major components mentioned above.

Using the cart require the golfer to be able to lift about 25-30 lbs (although the cart itself is compact and lightweight, with the clubs and accessories added, it would require some physical strength to handle). To use the cart, assuming the cart is fully installed and in folded position, the golfer will insert the golf clubs into the 14 pipes 22 & 15a as seen in FIG. 15. All irons, drivers, and fairway woods/hybrid clubs should be inserted into the side plastic pipes 22. The putter and chipping wedge should be inserted into the two center pipes, with the putter going in the larger pipe 15a shown in FIG. 15. The next step is to load the golf related accessories and items into the two tool belts 25a shown in FIG. 1. From this folded position, the cart is ready to be used for riding on a motorized cart. The cart is to be strapped onto the motorized cart with the impact absorber 20 pressed against the body of the motorized cart. The cart strap is to be slid underneath the tool belt through a gap between the tool belt and side plastic pipes 22. The strap will then wrap around the back of the golf cart, gripping against the leverage platform 16e shown in FIG. 17. From here, the cart strap can then be fastened, securing the folded cart onto the back of the motorized cart.

To use the cart for walking, the following four steps will help transform the cart from folding to a fully extended position. Be sure the folded cart is placed on an open and flat surface. 1). Hold the lift bar 21 and tilt the cart 45 degrees to one side. 2). Using the opposite hand and flip the positional lock pin 9c shown in FIG. 10 & FIG. 12 upward. This will disengage the lock pin 9c from the lock hatch 8b shown in FIG. 10. 3). Once the lock pin 9c is off to the side, grab the side struts 4 shown in FIG. 10 & FIG. 12 and pull them about 90 degrees downward. 4). Once the upper strut passes the secondary set of lock latch 8c shown in FIG. 11, flip the positional lock pin 9c inward. The lock pin 9c, with help from the spring-load 9b shown in FIG. 11, will snap onto the lock latch 8c firmly securing the struts in this extended position. Repeat this 4 step process for the opposite side until the two side struts and rear wheels are in a fully extended position as shown in FIG. 7.

Figure 22:
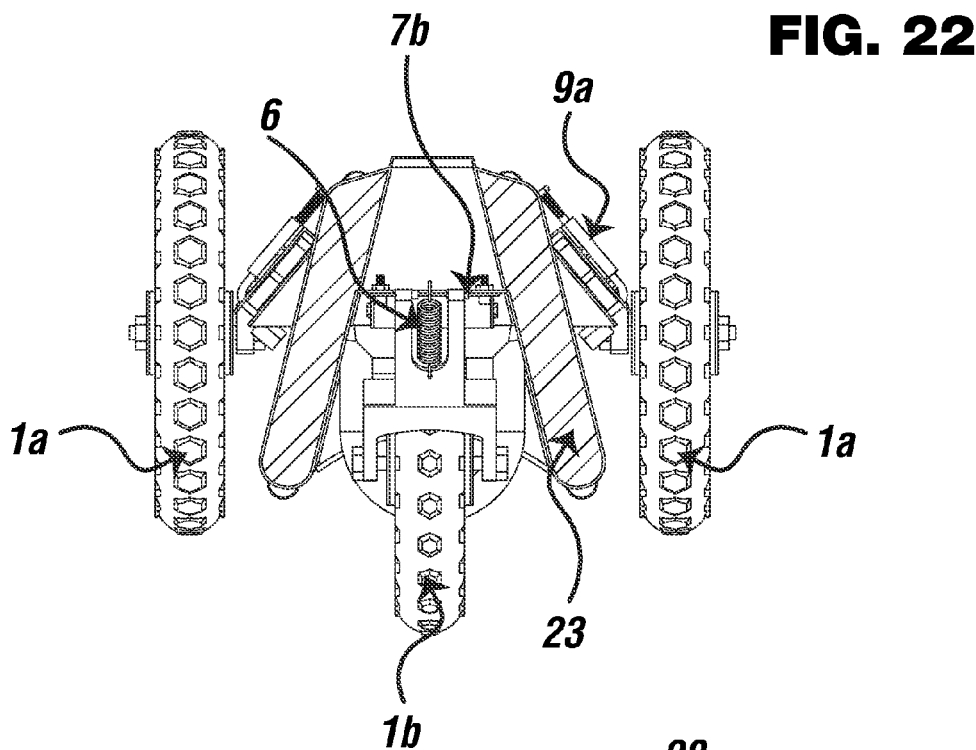
FIG. 22 shows a bottom view of the cart in a folded position for storage and riding mode.

Now that the rear wheels 1a and side struts 4 are fully extended, one last step is to set the y-arm and front wheel to a fully extended position. To do so, simply lift the cart and its entirety above the ground using the lift bar 21, kick the wheel 1b downward and away from the metal pipe spine 15a using your preferred foot. Once the y-arm position gets passed 180 degrees from it's previous position, the spring load 6 shown in FIG. 22 will pull the y-arm 5 along with the wheel 1b upward, pulling and snapping it against the lower v-base crossbar 24 shown in FIG. 9, FIG. 15, and FIG. 19. This constant pulling motion of the spring-load 6 will firmly secure the y-arm 5 and front wheel 1b in place.

The third and last component that needs to be extended is the push bar assembly 10a-10f, 11a-11b, 12a-12f, 13, 14a-14d shown in FIG. 21. Simply grab on to the operating handle 13 and pull it towards you. This will set the linkage elbows 11b to a fully extended position as shown in FIG. 9. A built-in locking mechanism in the elbow joint 11a will help maintain the linkage elbows in this extended position as shown in FIG. 9. The push bar assembly is equipped with a dial plate 12a shown in FIG. 4 and FIG. 19 for adjusting the operating handle bar 13 to four different prefixed positions 12e shown in FIG. 4 & FIG. 8. To adjust the push bar's position, simply pull on the pin knob 12b shown in FIG. 4 while rotating the operating handle 13 into the golfer's desired position. The lock pin's spring-load 12f shown in FIG. 2 will help snap the lock pin 12b in one of the preferred prefixed positions 12e. The cart is now fully extended and ready for some walking. As shown in FIG. 1 an umbrella 28a can be installed to provide shading as needed through the use of an adjustable umbrella holder 28b also shown in FIG. 1. The base of the umbrella holder 28b has a short stud (not shown) that can be screwed on to the top of the operating handle 13 as shown partially in FIG. 1. As mentioned above, a brake assembly 29a-29g as shown in FIG. 2, FIG. 9, and FIG. 20 is also added for occasional parking capability when the cart is used in this fully extended, walking mode.

To transition the cart from the fully extended, walking mode position into a folded position for storage after the round, the following 4 simple steps are to be followed: 1). Collapse the push bar using the pin knob 12b and setting the dial plate to the lowest prefixed position 12e shown in FIG. 19. (If installed, remove the umbrella 28a and its holder 28b shown in FIG. 1). 2) A slight upward nudge to the linkage elbows 11b with your hand will unlock them from an extended position. From here, push the operating handle 13 inward towards the body of the cart until it comes to a stop. 3). Collapse the front wheel 1b. To do so, the cart and its entirety needs to be lifted or tilted to the side, allowing the front wheel 1b to fold inward. The front wheel 1b then will need to be pushed down and inward towards the backside of the metal pipe spine. (Note that the lower push bar 10c is split into two smaller tubular bars as shown in FIG. 5 and FIG. 18 creating an open space in the center allowing the front wheel 1b to fold further inward pressing against the metal pipe spine 15a as shown in FIG. 19). This allow the cart to be folded in the most compact position possible relative to the design of the present invention. The constant pulling motion of spring-load 6 as shown in FIG. 19 will secure the y-arm and front wheel 1b in this folded position. (It should be known that the front wheel 1b is about two inches smaller in diameter than the rear wheels 1a. The intent is for a more compact folding position and saving storage space. Since most of the cart's weight rests on the two larger rear wheels 1a, the smaller front wheel 1b does not compromise the performance of the cart in a fully extended, walking position). 4). The last step is to set the two rear wheels and side struts into a folded position. First, while holding on to the lift bar 21, tilt the cart slightly to one side until the wheel is off the round, creating a temporarily gap between the upper strut 4 and the lock pin 9c shown in FIG. 3. Using the opposite hand, first pull the lock pin 9c towards you to release it from the lock hatch 8c, then flip the positional lock pin 9c shown in FIG. 11 upward disengaging it from the lock hatch 8c shown in FIG. 11 and FIG. 12. Once the lock pin 9c is off to the side, grab the side struts 4 shown in FIG. 10 and push them upward until the upper strut make contact with the brackets end wall 8d shown in FIG. 10 and FIG. 12. From here flip the positional lock pin 9c inward. The lock pin 9c with help from the spring-load 9b will snap onto the lock latch 8b firmly securing the struts in this folded position as shown in FIG. 10. Repeat this 4 step process for the opposite side until the two side struts 4 and rear wheels 1a are in a folded position as shown in FIG. 13. At this folded position shown in FIG. 13, the cart can stand on its own using the v-shape base structure 18. This folded position, due to its compact design, is mainly intended for space saving storage after the round of golf.

In conclusion, it is to be understood that the above mentioned detailed description of the preferred embodiments may be altered. These alterations and modifications, however, will not compromise or weaken the spirit or scope of the invention. The changes to be made in the future, if any, is only with the intention to further improve the objectives and advantages set forth by the present invention.

What is claimed is:
1. An all-in-one golf cart, comprising in combination:
at least three wheels, each of said at least three wheels rotatable and supporting the golf cart above a ground surface;
said at least three wheels movable between a collapsed storage position and an extended walking position, said at least three wheels located at a lowermost portion of the golf cart when in said extended walking position;
a push bar assembly collapsible between a storage position and an extended position;
a plurality of club holder pines including a plurality of said pipes in a left set and a plurality of said pipes in a right set;
an upper structure and a lower structure, said upper structure having a V-shape and said lower structure having a V-shape;
a spine extending between said upper structure and said lower structure, said spine fixed to said upper structure and said lower structure;

said club holder pipes connected to both said upper V-shaped structure and said lower V-shaped structure;

said at least three wheels including at least two rear wheels;

each of said rear wheels rotatably supported from said lower V-shaped structure through at least one side strut which pivots relative to said V-shaped structure between said collapsed storage position and said extended walking position;

said at least two rear wheels supporting most of a weight of the cart when fully loaded and when said at least two rear wheels are extended into said walking position;

said at least three wheels including a third wheel located centrally between said at least two rear wheels and forward of said at least two rear wheels, said front wheel rotatably attached to said lower V-shaped structure, said third wheel supporting weight of the cart not carried by said at least two rear wheels;

said upper V-shaped structure and said lower V-shaped structure connected together at least partially through said club holder pipes with said upper V-shaped structure;

a brake coupled to at least one of said at least three wheels;

said at least three wheels oriented to remain parallel with each other in both storage positions and extended walking positions for said wheels;

said at least three wheels when fully extended to said walking position having a broad triangular form with broad distances between each of said at least three wheels to provide a stable base for the cart when moving; and said at least two rear wheels located further from each other when in said extended walking position than a height of the cart, providing stability for the cart.

2. The cart of claim 1 wherein each of said at least two rear wheels is coupled to said lower V-shaped structure through a set of at least two side struts which are pivotable to move each of said at least two rear wheels between said storage position and said extended walking position.

3. The cart of claim 1 wherein a locking mechanism is associated with each of said side struts coupling each of said at least two rear wheels to said lower V-shaped structure, to hold said at least two rear wheels in either said storage position and said extended walking position.

4. The cart of claim 1 wherein said at least one front wheel is rotatably supported by a pivotable Y-arm assembly, said Y-arm assembly pivoting between a storage position and an extended walking position for said at least one front wheel.

5. The cart of claim 1 wherein said push bar assembly includes a handle thereon, said push bar assembly including a score card space and an umbrella holder thereon, said push bar assembly being adjustable to different extended positions at different heights, such as for ergonomic optimization.

6. An all-in-one golf cart, comprising in combination:
at least three wheels, each of said at least three wheels rotatable and supporting the golf cart above a ground surface;

said at least three wheels movable between a collapsed storage position and an extended walking position, said at least three wheels located at a lowermost portion of the golf cart when in said extended walking position;

a push bar assembly collapsible between a storage position and an extended position;

a plurality of club holder pipes including a plurality of said pipes in a left set and a plurality of said pipes in a right set;

an upper structure and a lower structure, said upper structure having a V-shape and said lower structure having a V-shape;

a spine extending between said upper structure and said lower structure, said spine fixed to said upper structure and said lower structure;

said club holder pipes connected to both said upper V-shaped structure and said lower V-shaped structure;

said at least three wheels including at least two rear wheels;

each of said rear wheels rotatably supported from said lower V-shaped structure through at least one side strut which pivots relative to said V-shaped structure between said collapsed storage position and said extended walking position;

said at least two rear wheels supporting most of a weight of the cart when fully loaded and when said at least two rear wheels are extended into said walking position;

said at least three wheels including a third wheel located centrally between said at least two rear wheels and forward of said at least two rear wheels, said front wheel rotatably attached to said lower V-shaped structure, said third wheel supporting weight of the cart not carried by said at least two rear wheels;

said upper V-shaped structure and said lower V-shaped structure connected together at least partially through said club holder pipes with said upper V-shaped structure;

a brake coupled to at least one of said at least three wheels; and said lower V-shaped structure supporting said plurality of club holder pipes in a single left set of club holder pipes and a plurality of club holder pipes in a right side set of club holder pipes, said left set of club holder pipes and said right set of club holder pipes defining opposite legs of a V-shaped configuration coupled to said lower V-shaped structure and said upper V-shaped structure.

7. The cart of claim 6 wherein said upper V-shaped structure includes at least one lift bar for lifting and handling the cart, said upper V-shaped structure supporting a tool belt bracket with a tool belt coupled to the tool belt bracket;

said upper V-shaped structure including an impact absorber to at least partially absorb rattling of the cart when moving upon a motorized golf car; and the club holder piles of said left set and said right set spaced laterally from each other along a single line to facilitate organization of clubs with one club within each club holder pipe, facilitating the clubs being arranged sequentially along said line of said club holder pipes of said left set and said right set.

8. An all-in-one golf cart, comprising in combination:
at least three wheels, each of said at least three wheels rotatable and supporting the golf cart above a ground surface;

said at least three wheels movable between a collapsed storage position and an extended walking position, said at least three wheels located at a lowermost portion of the golf cart when in said walking position;

a push bar assembly collapsible between a storage position and an extended position;

a plurality of club holder pipes including a plurality of said pipes in a left set and a plurality of said pipes in a right set;

an upper structure and a lower structure, said upper structure having a V-shape and said lower structure having a V-shape;

a spine extending between said upper structure and said lower structure, said spine fixed to said upper structure and said lower structure;

said club holder pipes connected to both said upper structure and said lower structure;

said at least three wheels including at least two rear wheels;

each of said rear wheels rotatably supported from said lower V-shaped structure through a side strut which pivots relative to said V-shaped structure;

said at least two rear wheels supporting most of a weight of the cart when fully loaded and when said at least two rear wheels are extended into said walking position;

said at least three wheels including a third wheel located centrally between said at least two rear wheels and forward of said at least two rear wheels, said front wheel rotatably attached to said lower V-shaped structure, said third wheel supporting weight of the cart not carried by said at least two rear wheels;

said upper V-shaped structure and said lower V-shaped structure connected together at least partially through said club holder pipes with said upper V-shaped structure and said lower V-shaped structure being mere images of each other;

a brake coupled to at least one of said at least three wheels; and said plurality of club holder pipes providing structural support for said upper V-shaped structure above said lower V-shaped structure to provide at least a portion of structural stability for the cart.

9. The cart of claim 8 wherein said plurality of club holder pipes includes at least fourteen club holder pipes with at least six of said club holder pipes provided within said left set and at least six of said club holder pipes provided within said right set, each of said club holder pipes sized to hold only one golf club.

10. The cart of claim 8 wherein a hand brake is removably placeable against at least one of said wheels, said hand brake moveable between a locked position resisting wheel rotation and an unlocked position.

11. The cart of claim 8 wherein at least two removable tool belts are removably coupled to the cart, each of said tool belts including a plurality of pockets for miscellaneous golfer items.

12. The cart of claim 8 wherein said at least one front wheel pivots between said storage position and said extended walking position by pivoting down under a lower portion of the cart and then up behind a rearward portion of the cart into a space between said at least two rear wheels when said front wheel is in said storage position.

13. The cart of claim 8 wherein different portions of the cart are formed of different materials with some of the portions of the cart formed of lightweight materials to minimize overall weight of the cart and other portions of the cart formed of materials exhibiting higher rigidity and strength than other portions of the golf cart such that weight minimization and rigidity and strength of the cart is optimized by such multi-material construction.

14. The cart of claim 5 wherein said push bar assembly extends substantially parallel with a long axis of said cart when in said storage position and is positioned to be easily gripped for handling of said cart when said push bar assembly is in said storage position.

15. The cart of claim 6 wherein said cart has a width when in said collapsed storage position sufficiently small to fit in a golf bag holder of a motorized golf car.

16. The cart of claim 6 wherein at least two of said plurality of club holder pipes are between said left set of club holder pipes and said right set of club holder pipes, defining a middle set of club holder pipes.

17. The cart of claim 16 wherein said at least two club holder pipes of said middle set include at least one larger diameter club holder pipe, such that a putter with an oversize grip can be accommodated.

18. The cart of claim 17 wherein said larger diameter club holder pipe is within an interior of said spine.

19. The cart of claim 2 wherein said at least two side struts remain parallel as they pivot to move said at least two rear wheels from said storage position closer to each other and said extended position further from each other.

* * * * *